(12) United States Patent
Nishimori et al.

(10) Patent No.: US 11,699,818 B2
(45) Date of Patent: Jul. 11, 2023

(54) BATTERY PACK

(71) Applicant: VEHICLE ENERGY JAPAN INC., Hitachinaka (JP)

(72) Inventors: Hitoshi Nishimori, Tokyo (JP); Takayuki Nakajima, Ibaraki (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 328 days.

(21) Appl. No.: 16/965,977

(22) PCT Filed: Dec. 18, 2018

(86) PCT No.: PCT/JP2018/046461
§ 371 (c)(1),
(2) Date: Jul. 29, 2020

(87) PCT Pub. No.: WO2019/150806
PCT Pub. Date: Aug. 8, 2019

(65) Prior Publication Data
US 2021/0036280 A1 Feb. 4, 2021

(30) Foreign Application Priority Data
Jan. 31, 2018 (JP) ................................. 2018-015713

(51) Int. Cl.
*H01M 50/209* (2021.01)
*H01M 50/20* (2021.01)
(Continued)

(52) U.S. Cl.
CPC ........... *H01M 10/44* (2013.01); *H01M 50/20* (2021.01); *H01M 50/209* (2021.01); *H01M 50/264* (2021.01)

(58) Field of Classification Search
CPC ............................ H01M 50/20; H01M 50/209
See application file for complete search history.

(56) References Cited

U.S. PATENT DOCUMENTS

| 2013/0192914 A1 | 8/2013 | Nakamori | |
| 2016/0093845 A1* | 3/2016 | DeKeuster | ............ H01M 4/525 |
| | | | 429/99 |

(Continued)

FOREIGN PATENT DOCUMENTS

| EP | 2685523 A1 | 1/2014 |
| EP | 2916369 A1 | 9/2015 |

(Continued)

OTHER PUBLICATIONS

Extended European Search Report dated Sep. 22, 2021 for European Patent Application No. 18904252.6.

(Continued)

*Primary Examiner* — Jonathan G Jelsma
(74) *Attorney, Agent, or Firm* — Volpe Koenig

(57) ABSTRACT

Provided is a battery pack capable of improving load resistance of a reinforcing part and protecting battery cells inside a case. The battery pack 100 includes a reinforcing part 30 that is in contact with a bottom wall 10e of the case 10. The reinforcing part 30 extends in one direction D1 along the bottom wall 10e, and has dimensions d1, d2 in directions orthogonal to the one direction D1 that are larger than thickness t of side walls 10a, 10b, 10c, 10d of the case 10 and of the bottom wall 10e. The reinforcing part 30 has a pair of end fixed parts 31 that are fixed to both ends of the battery module 20 in the one direction D1, and an intermediate fixed part 32 between the pair of end fixed parts 31 and fixed to the battery module 20 or the case 10.

20 Claims, 9 Drawing Sheets

(51) Int. Cl.
*H01M 10/44* (2006.01)
*H01M 50/264* (2021.01)

(56) References Cited

U.S. PATENT DOCUMENTS

| | | | | |
|---|---|---|---|---|
| 2016/0093862 A1* | 3/2016 | DeKeuster | .......... | H01M 50/209 |
| | | | | 429/121 |
| 2016/0240835 A1* | 8/2016 | Sakurai | ............... | H01M 50/271 |
| 2016/0344073 A1 | 11/2016 | Hayashi et al. | | |
| 2016/0359153 A1* | 12/2016 | Kano | .................... | H01M 50/20 |
| 2018/0190955 A1 | 7/2018 | Motohashi et al. | | |
| 2019/0267585 A1* | 8/2019 | Pellenc | ............. | H01M 10/0525 |

FOREIGN PATENT DOCUMENTS

| | | |
|---|---|---|
| JP | 2013-157242 A | 8/2013 |
| JP | 2016-157561 A | 9/2016 |
| JP | 2016-219260 A | 12/2016 |
| WO | 2013/098982 A1 | 7/2013 |
| WO | 2016/208183 A1 | 12/2016 |

OTHER PUBLICATIONS

International Search Report, PCT/JP2018/046461, dated Feb. 26, 2019, 2 pgs.

* cited by examiner

BATTERY PACK

TECHNICAL FIELD

The present invention relates to battery packs each having a plurality of battery cells.

BACKGROUND ART

Conventionally inventions about an improvement of a battery pack for vehicle, such as an electric vehicle and a hybrid vehicle, have been known (see Patent Literature 1). The battery pack described in Patent Literature 1 has the following feature. A plurality of flattened box-shaped battery modules is piled up flat in an approximately rectangular pack case that is mounted to a vehicle in the posture so that the long side of the pack case coincides with the vehicle traveling direction. A terminal on a short side of each battery module is directed in a longitudinal direction of the pack case.

A cooling unit is disposed at one end of the pack case in the longitudinal direction and is configured to circulate the cooling air in the pack case. A junction box storing a plurality of relays is disposed beside the cooling unit in a width direction of the pack case. The cooling unit is configured to send the cooling air along an outer periphery of the pack case, and the junction box is disposed most downstream of the cooling air (see this literature in claim 1, for example).

In the battery pack described in Patent Literature 1, the pack case includes a reinforcement bar at one end of the pack case in the longitudinal direction where the junction box is located. The reinforcement bar extends in the width direction of the pack case and connects between a pair of side walls of the pack case. This reinforcement bar passes above the junction box (see this literature in claim 5, for example).

This battery pack can be designed more freely in the vertical direction and accordingly the vehicle body floor can be designed more freely in the vertical direction. In addition, the restriction on the battery pack design due to the size in a vehicle width direction is reduced. The battery pack therefore is suitable for relatively small vehicles. The battery pack can be cooled effectively with a relatively small-capacity cooling unit (see this literature in paragraph 0011, for example).

This reinforcement bar passes above the junction box, and is connected to the right and left flanges of the lower pack case member. Even if external force is applied from the above to the battery pack due to vehicular crash, for example, the junction box through which the large current flows can be protected for sure (see this literature, in paragraph 0035, for example).

CITATION LIST

Patent Literature

Patent Literature 1: JP 2016-219260 A

SUMMARY OF INVENTION

Technical Problem

In this conventional battery pack, the reinforcement bar passing above the junction box is connected to the right and left flanges of the lower pack case member, and so is structured like a beam having both ends supported. When an external force acts on the battery pack, the reinforcement bar easily bends and so has a problem in load resistance.

One aspect of the present invention provides a battery pack capable of improving load resistance of a reinforcing part and protecting battery cells inside a case.

Solution to Problem

A battery pack according to one aspect of the present invention includes: a battery module including a plurality of secondary cells; and a case that stores the battery module, the case having a bottom wall and side walls, the battery pack including a reinforcing part that is in contact with the bottom wall of the case, the reinforcing part extending in one direction along the bottom wall, and having a dimension in a direction orthogonal to the one direction that is larger than thickness of the side walls and of the bottom wall of the case, the reinforcing part having a pair of end fixed parts that are fixed to both ends of the battery module in the one direction, and an intermediate fixed part located between the pair of end fixed parts and fixed to the battery module or the case.

In this battery pack, the reinforcing part extends from one end to the other end of the battery module including the secondary cells, and reinforces the case and the battery module. The reinforcing part is in contact with the bottom wall of the case and extends in the one direction along the bottom wall. When an external force acts on the case, this configuration suppresses bending of the reinforcing part in the directions intersecting the one direction as the extending direction of the reinforcing part, including the direction in which the reinforcing part and the battery module face each other.

In the one direction as the extending direction, the reinforcing part is fixed at two points to both ends of the battery module via the pair of end fixed parts and fixed at one point between the pair of end fixed parts to the battery module or the casing. That is, the reinforcing part is fixed at three or more points. In this way, the reinforcing part is fixed at three or more points of the both ends and the intermediate portion in the one direction, so that when an external force acts on the case, bending of the reinforcing part can be prevented in the directions intersecting the one direction.

The reinforcing part has a dimension in a direction orthogonal to the one direction as the extending direction that is larger than the thickness of the side walls and of the bottom wall of the case. This improves the rigidity of the reinforcing part, and so reinforces the case and the battery module effectively. When an external force acts on the case, this configuration suppresses deformation and damage of the case and the battery module.

Advantageous Effects of Invention

One aspect of the present invention provides a battery pack capable of improving load resistance of a reinforcing part and protecting secondary cells inside a case.

DESCRIPTION OF EMBODIMENTS

The following describes a battery pack according to one embodiment of the present invention, with reference to the drawings.

Figure 1:
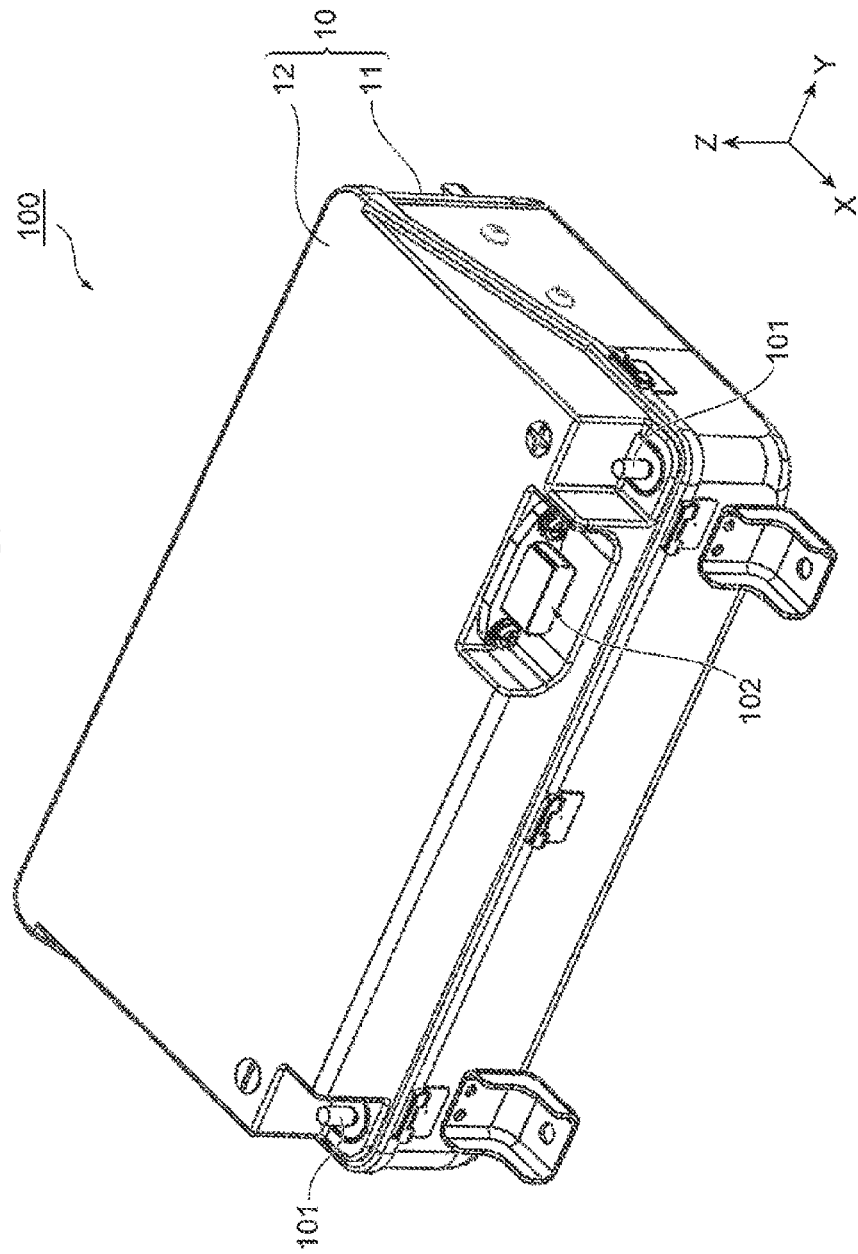
FIG. 1 is a perspective view of the appearance of a battery pack according to one embodiment of the present invention.
Figure 2:
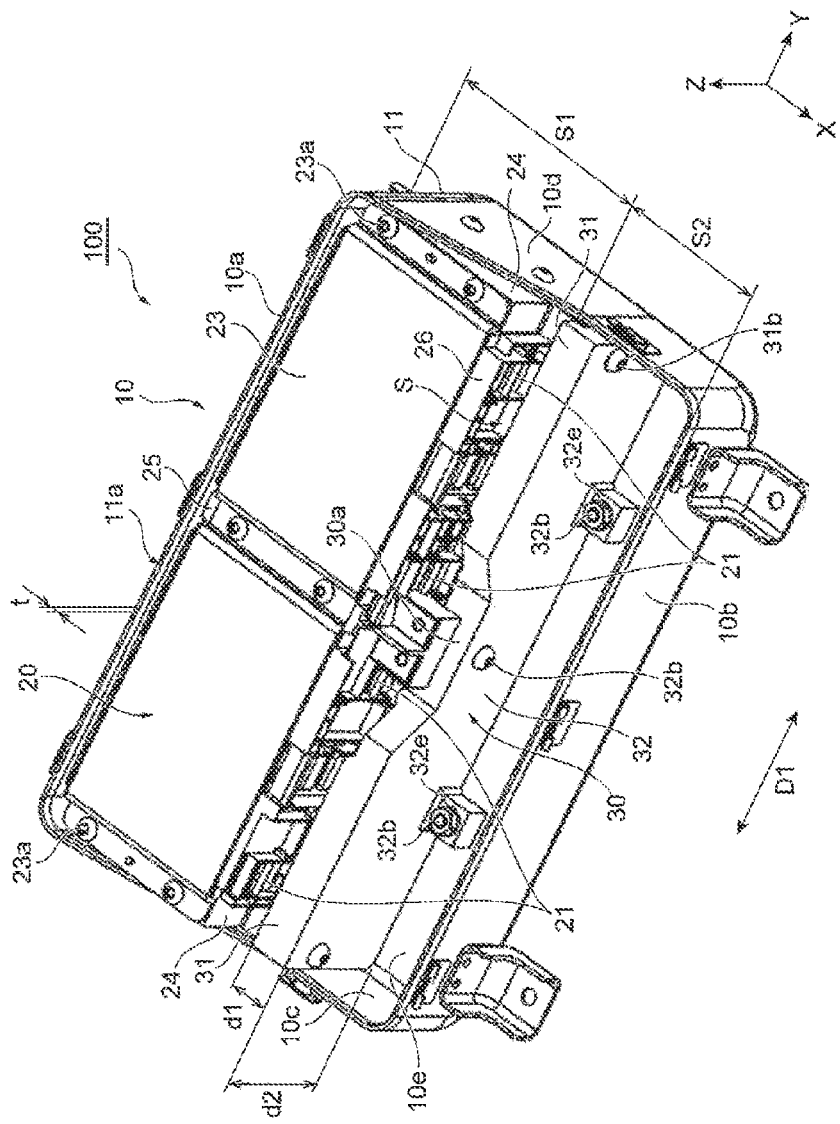
FIG. 2 is a perspective view of the battery pack of FIG. 1, illustrating the state after removing a part of the case and auxiliaries.
Figure 3:
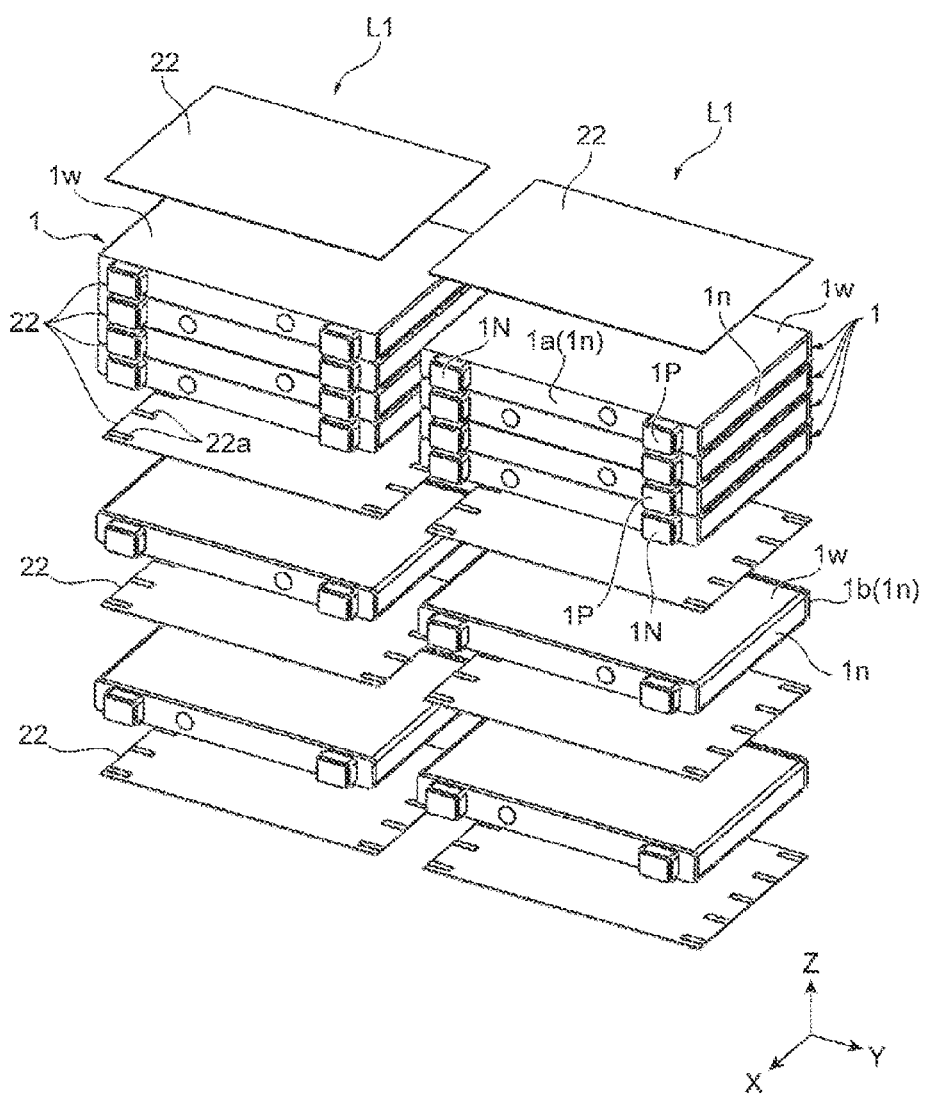
FIG. 3 is a perspective view illustrating how to stack a plurality of secondary cells in the battery pack of FIG. 1.

FIG. 1 is a perspective view illustrating the appearance of a battery pack 100 according to one embodiment of the present invention. FIG. 2 is a perspective view of the battery pack 100 of FIG. 1, illustrating the state after removing a part of the case 10 and auxiliaries. FIG. 3 is a perspective view illustrating how to stack a plurality of secondary cells 1 stored in the case 10 of the battery pack 100 of FIG. 1.

The battery pack 100 of the present embodiment includes a battery module 20 made up of the plurality of secondary cells 1, and the case 10 that stores the battery module 20. Although the details are described later, the battery pack 100 of the present embodiment mainly has the following feature. The battery pack 100 has a reinforcing part 30 that is in contact with a bottom wall 10e of the case 10. The reinforcing part 30 extends in one direction D1 along the bottom wall 10e, and has a dimension in a direction orthogonal to the one direction D1 that is larger than thickness t of side walls 10a, 10b, 10c, 10d of the case 10 and of the bottom wall 10e. The reinforcing part 30 has a pair of end fixed parts 31 that are fixed to both ends of the battery module 20 in the one direction D1, and an intermediate fixed part 32 located between the pair of end fixed parts 31 and fixed to the battery module 20 or the case 10. The following describes the configuration of various parts of the battery pack 100 of the present embodiment in more detail.

The case 10 has a substantially cuboid and rectangular box shape, for example. Each drawing shows the orthogonal coordinate system in which the depth direction of the case 10 is the X axis, the width direction is the Y axis, and the height direction is the Z axis. The dimension of the case 10 in the width direction is larger than the size in the depth direction. That is, the case 10 has a rectangular box shape having a bottom wall, and has a height direction (Z-axis direction) perpendicular to the bottom wall, a longitudinal direction (Y-axis direction) perpendicular to the height direction, and a transverse direction (X-axis direction) perpendicular to these longitudinal direction and height direction.

In one example, the case 10 has a rectangular box-shaped main body 11 having an open top, and a cover 12 that covers an opening 11a at the top of the main body 11. In one example, the main body 11 is made of a metal material, such as an electro galvanized steel sheet, and the cover 12 is made of a resin material, such as polybutylene terephthalate (PBT). A pair of high-voltage terminals 101 and 101 are external terminals of the positive electrode and the negative electrode of the battery pack 100, and are provided at one end in the transverse direction and at both ends in the longitudinal direction of the cover of the case 10. A signal connector 102 is also disposed at the one end in the transverse direction of the cover of the case 10 where the high-voltage terminals 101 and 101 are provided. The signal connector 102 is disposed at a position between the pair of high-voltage terminals 101 in the longitudinal direction of the case 10 and adjacent to one of the high-voltage terminals 101.

The case 10 has a battery storage space S1. This battery storage space S1 is an area, a space, a section or a storage part to store the secondary cells 1 inside the case 10. In one example, the battery storage space S1 is adjacent to the side wall 10a in the transverse direction of the case 10 and so is displaced toward the one side in the transverse direction of the case 10. In one example, the battery storage space S1 is defined by the three side walls 10a, 10c, 10d on one side in the transverse direction and on both sides in the longitudinal direction of the case 10, the bottom wall 10e and the cover 12, and a resin bus bar case 26 that is opposed to a terminal face 1a of each secondary cell 1.

The battery pack 100 of the present embodiment includes the battery module 20 made up of the plurality of secondary cells 1 that is disposed in the battery storage space S1. The battery module 20 has a pair of side blocks 24 at both ends in one direction D1 that is along the bottom wall 10e of the case 10, and a center block 25 between the pair of side blocks 24, and includes the plurality of secondary cells 1 between the center block 25 and each of the side blocks 24.

As illustrated in FIG. 3, each of the secondary cells 1 making up the battery module 20 is a flattened rectangular lithium-ion secondary cell, for example. That is, each secondary cell 1 in the battery pack 100 of the present embodiment has a flattened rectangular shape and has wide side surfaces 1w facing the thickness direction (Z-axis direction) of the secondary cells 1 and narrow side surfaces 1n along the thickness direction. These secondary cells 1 are stacked in the thickness direction so that the wide side surfaces 1w face the bottom wall 10e of the case 10, and the terminal surfaces 1a that are one of the narrow side surfaces 1n face the reinforcing part 30.

More specifically, each secondary cell 1 has rectangular wide side surfaces 1w having the largest area on both sides in the thickness direction, and a bottom surface 1b and a terminal surface 1a, which are long and narrow rectangular side surfaces 1n, on one end and the other end of the wide side surfaces 1w in the transverse direction. Each secondary cell 1 also has narrow side surfaces 1n having the smallest area on both ends of the wide side surfaces 1w in the longitudinal direction. Each secondary cell 1 has external terminals 1P and 1N on the terminal surface 1a that is one of the narrow side surfaces 1n along the thickness direction.

More specifically, these positive and negative external terminals 1P and 1N are spaced from each other at one end and the other end in the longitudinal direction of the terminal surface 1a of the secondary cell 1. The external terminals 1P and 1N each have a substantially cuboid block shape protruding from the terminal surface 1a toward the reinforcing part 30 in a direction perpendicular to the terminal surface 1a of the secondary cell 1. In this way, each secondary cell 1 has the external terminals 1P and 1N on the terminal surface 1a as one of the narrow side surfaces 1n that is opposed to the reinforcing part 30 so as to protrude toward the reinforcing part 30.

The battery module 20 includes the flattened rectangular secondary cells 1 stacked in the thickness direction so that the wide side surfaces 1w facing the thickness direction of the secondary cells 1 are opposed to the bottom wall 10e of the case 10. In one example, the battery module 20 has a plurality of battery rows L1 including two or more rows, each including the plurality of secondary cells 1 stacked in the thickness direction. In one example, the two or more battery rows L1 are aligned in the longitudinal direction of the terminal surfaces 1a of the secondary cells 1 making up these battery rows L1.

The terminal surfaces 1a of all of the secondary cells 1 making up each battery row L1 of the battery module 20 face in one direction, that is, to the front in the depth direction of the case 10 of the battery pack 100 (X-axis positive direction). Two of these secondary cells 1 that are adjacent to each other in the stacking direction are alternately inverted by 180 degrees. This means that the two secondary cells 1 adjacent to each other in the stacking direction have a positive external terminal 1P of one of the secondary cells 1 and a negative external terminal 1N of the other secondary cell 1 that are adjacent to each other in the stacking direction.

In one example, the plurality of secondary cells 1 in each battery row L1 of the battery module 20 are connected in series from a secondary cell 1 disposed at one end in the stacking direction to a secondary cell 1 disposed at the other end in the stacking direction via a bus bar 21. More specifically, two mutually adjacent secondary cells 1 in the stacking direction are connected by connecting the positive external terminal 1P of one of the secondary cells 1 to the negative external terminal 1N of the other secondary cell 1 via a bus bar 21, so that the plurality of secondary cells 1 in the battery module 20 are sequentially connected in the stacking direction in series. In another example, the battery module 20 has a plurality of battery rows L1 connected in series or in parallel by a bus bar 21.

The battery module 20 has cell holders 22 on both sides of each of the secondary cells 1 in the thickness direction so that each of the cell holders 22 is opposed to the corresponding wide side surface 1w. Each cell holder 22 has a plurality of protrusions 22a on the surface facing the wide side surface 1w of the corresponding secondary cell 1, and the protrusions 22a come into contact with the wide side surface 1w. The cell holders 22 are stacked alternately with the secondary cells 1 in the stacking direction of the secondary cells 1 to hold each of the secondary cells 1 from both sides in the thickness direction. The cell holders 22 at both ends in the stacking direction of the secondary cells 1 are flat on the side opposite of the secondary cell 1. In one example, the cell holders 22 are made of resin having an electrical insulating property, such as PBT, and may be manufactured by injection molding.

In one example, the battery module 20 includes the secondary cells 1, the bus bars 21, the cell holders 22, end plates 23, the side blocks 24, the center block 25, and the bus bar case 26.

The bus bars 21 are a metal plate member connected to the external terminals 1P and 1N of the secondary cells 1. In one example, the pair of end plates 23 are metal plate members, and are disposed on the outside of the cell holders 22 at both ends in the stacking direction of the secondary cells 1. These end plates 23 sandwich the plurality of secondary cells 1 via the plurality of cell holders 22 from both sides in the stacking direction.

In one example, the side block plates 24 are metal plate or block members, and are disposed at both ends in the aligned direction of the two or more battery rows L1 aligned in the longitudinal direction of the terminal surfaces 1a of the secondary cells 1. Each of the side blocks 24 is opposed to the corresponding narrow side surfaces 1n of the secondary cells 1 via a resin member having an electrical insulating property, such as a part of the cell holders 22. In one example, the pair of side blocks 24 each have screw holes at upper and lower ends in the height direction of the case 10, and are fixed to the end plates 23 by bolts 23a.

In one example, the center block 25 is a metal plate or block member, and is disposed between the battery rows L1 and L1. The center block 25 is opposed to the narrow side surfaces 1n of the secondary cells 1 via a resin member having an electrical insulating property, such as a part of the cell holders 22. In the case of two battery rows L1, one center block 25 is disposed between these battery rows L1. In the case of three or more battery rows L1, two or more center blocks 25 are disposed between these battery rows L1. In one example, the center block(s) 25 has(have) screw holes at upper and lower ends in the height direction of the case 10, and is(are) fixed to the end plates 23 by bolts 23a.

In one example, the bus bar case 26 is a resin plate or frame member having an electrical insulating property, and is opposed to the terminal surfaces 1a of the plurality of secondary cells 1 making up the battery module 20. In one example, the busbar case 26 has openings at positions corresponding to the external terminals 1P and 1N of the plurality of secondary cells 1, and supports the busbars 21 at supporting portions around the openings. The bus bar case 26 also electrically insulates the adjacent bus bars 21 with a partition wall.

Figure 4:
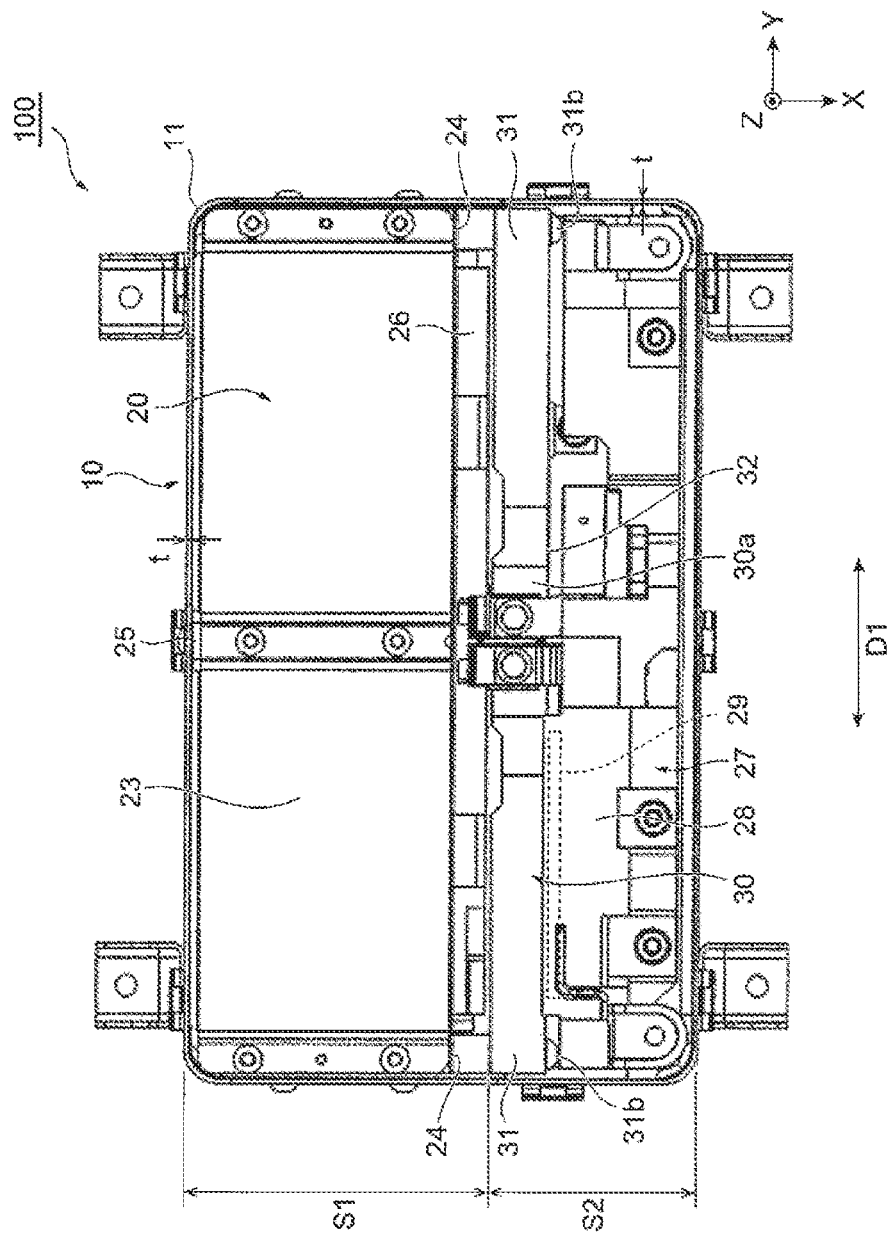
FIG. 4 is a plan view illustrating auxiliaries disposed in the case of FIG. 2.

FIG. 4 is a plan view illustrating auxiliaries 27 disposed in the main body 11 of the case 10 of FIG. 2. As illustrated in FIG. 2, the battery pack 100 of the present embodiment has an auxiliary storage space S2 inside the case 10 to be closer to the front side wall 10b in the transverse direction and adjacent to the battery storage space S1. In one example, the auxiliaries 27 of the battery pack 100 are placed in the auxiliary storage space S2. In one example, the auxiliaries 27 include a control unit 28 that controls charging and discharging of the secondary cells 1. In one example, the control unit 28 may be configured as a junction box that stores an electronic circuit board 29.

Figure 5:
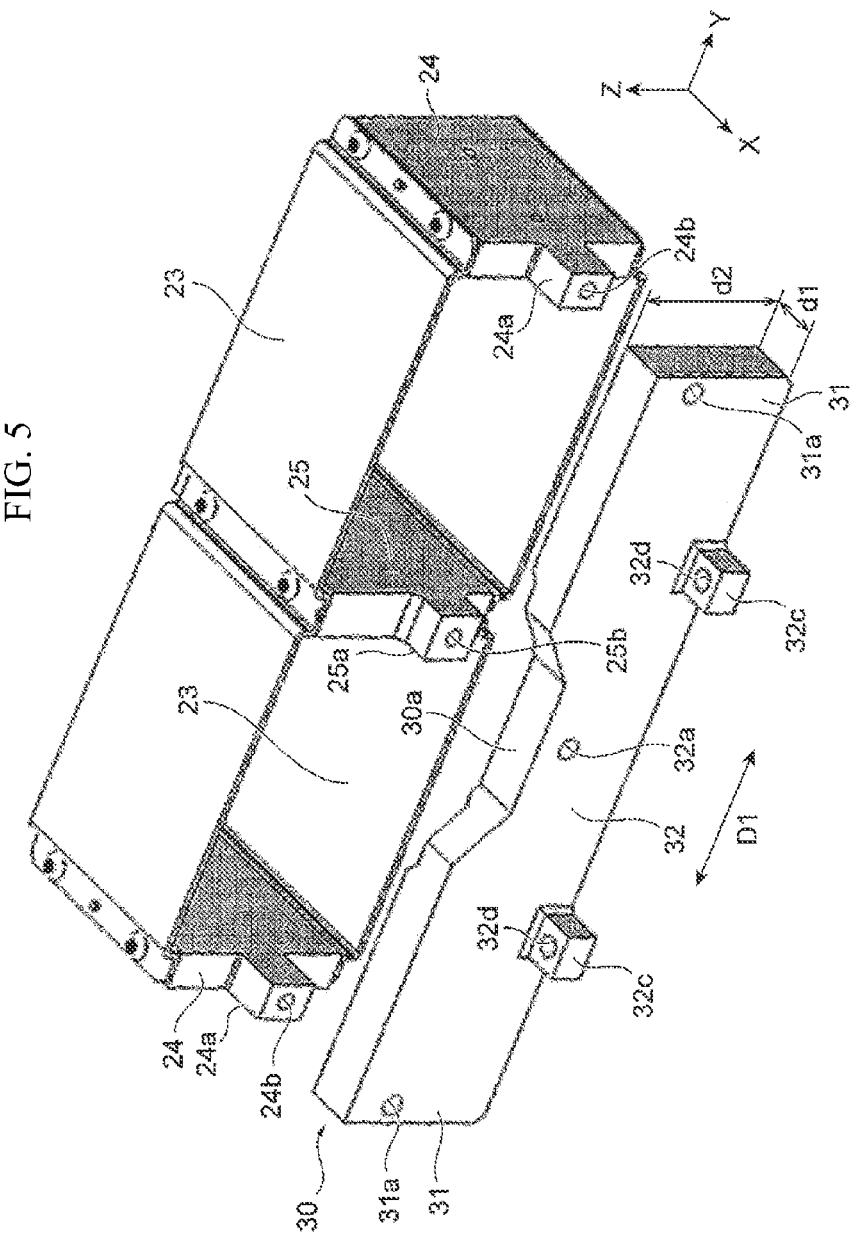
FIG. 5 is an exploded perspective view of the reinforcing part and the battery module in FIG. 2.

FIG. 5 is an exploded perspective view of the reinforcing part 30, and the end plates 23, the side blocks 24, and the center block 25 making up the battery module 20 of FIG. 2.

As described above, the reinforcing part 30 is in contact with the bottom wall 10e of the case 10 and extends in the one direction D1 along the bottom wall 10e. More specifically, the reinforcing part 30 is a block, a rod, a pillar, a beam, or a plate member that extends in the one direction D1 that is substantially parallel to the longitudinal direction (Y-axis direction) of the case 10. In one example, the reinforcing part 30 is a solid member having no cavity inside. In one example, the reinforcing part 30 is made of metal, such as stainless steel or aluminum alloys. When the reinforcing part 30 is manufactured by die casting, the surface of the reinforcing part 30 may have uneven parts for lightening.

The battery pack 100 of the present embodiment is configured so that the reinforcing part 30 has a length in the one direction D1 that is larger than the length of the secondary cells 1 in the one direction D1. This means that the both ends of the secondary cells 1 are placed inside the both ends of the reinforcing part 30 in the one direction D1. In one example, the reinforcing part 30 has a cutout 30a at a center part in the one direction D1 as the extending direction and at an end on the opposite side of the bottom wall 10e of the case 10 in the height direction (Z-axis direction) of the case 10. This avoids interference between the reinforcing part 30 and a terminal portion projecting from the busbar case 26 in the transverse direction (X-axis direction) of the case 10 where the reinforcing part 30 and the battery module 20 face each other.

As described above, the reinforcing part 30 has dimensions d1 and d2 in the directions orthogonal to the one direction D1 as the extending direction, and the dimensions d1 and d2 are larger than the thickness t of the side walls 10a, 10b, 10c, 10d and the bottom wall 10e of the case 10. More specifically, the reinforcing part 30 has a rectangular cross section that is orthogonal to the one direction D1, for example, and the dimensions d1 and d2 in the transverse direction (X-axis direction) and the height direction (Z-axis direction) of the case 10 that are orthogonal to the one direction D1 are larger than the thickness t of the side walls 10a, 10b, 10c, 10d and the bottom wall 10e of the case 10.

Note here that d1 and d2 of the reinforcing part 30 are dimensions from one end face to the other end face of the reinforcing part 30 regardless of the presence or absence of the uneven portions on the surface of the reinforcing part 30. When the reinforcing part 30 has a hollow structure, the dimensions d1 and d2 of the reinforcing part 30 may be the wall thickness of the reinforcing part 30. In any case, the dimensions d1 and d2 of the reinforcing part 30 are determined so that the rigidity of the reinforcing part 30 against an external force acting on the case 10 is higher than the rigidity of the case 10.

As described above, the reinforcing part 30 has the pair of end fixed parts 31 that are fixed to both ends of the battery module 20 in the one direction D1, and the intermediate fixed part 32 located between the pair of end fixed parts 31 and fixed to the battery module 20 or the case 10. In one example, the end fixed parts 31 each have a through hole 31a for insertion of a bolt 31b. In one example, the through hole 31a penetrates through the reinforcing part 30 in the transverse direction (X-axis direction) of the case 10, where the reinforcing part 30 and the battery module 20 face each other.

In one example, the intermediate fixed part 32 has a through hole 32a for insertion of a bolt 32b and fixing protrusions 32c. In one example, the through hole 32a penetrates through the reinforcing part 30 in the transverse direction (X-axis direction) of the case 10, where the reinforcing part 30 and the battery module 20 face each other. In one example, the fixing protrusions 32c are provided on both sides of the through hole 32a in the one direction D1 as the extending direction of the reinforcing part 30.

In one example, the fixing protrusions 32c protrude from the surface of the reinforcing part 30 on the opposite side of the battery module 20, and extend in the transverse direction of the case 10 to be away from the battery module 20. The surface of each fixing protrusion 32c facing the bottom wall 10e of the case 10 is in contact with the bottom wall 10e of the case 10. Each fixing protrusion 32c has a through hole 32d penetrating through the fixing protrusion 32c in the height direction (Z-axis direction) of the case 10. This through hole 32d is for insertion of a bolt 32b to fix the fixing protrusion 32c to the bottom wall 10e of the case 10.

In one example, each of the end fixed parts 31 of the reinforcing part 30 in the battery pack 100 of this embodiment is fixed to the corresponding side block 24 of the battery module 20. In one example, the intermediate fixed part 32 of the reinforcing part 30 is fixed to the center block 25 or the case 10. Note here that the end fixed parts 31 may be fixed to both ends of the battery module 20, and may be fixed to components of the battery module 20 other than the side blocks 24. The intermediate fixed part 32 of the reinforcing part 30 may be fixed to both of the center block 25 and the case 10.

In the battery pack 100 of the present embodiment, each of the side blocks 24 of the battery module 20 has a protrusion 24a that protrudes in the transverse direction (X-axis direction) of the case 10 that is the protruding direction of the external terminals 1P and 1N of the secondary cells 1. Each protrusion 24a has a dimension in the protruding direction larger than the dimension of the external terminals 1P, 1N of the secondary cells 1 in the protruding direction, and so defines a space S between the external terminals 1P, 1N and the reinforcing part 30. Each protrusion 24a has a screw hole 24b on the surface facing the reinforcing part 30.

Similarly, the center block 25 of the battery module 20 has a protrusion 25a protruding in the transverse direction (X-axis direction) of the case 10 that is the protruding direction of the external terminals 1P and 1N of the secondary cells 1. The protrusion 25a has a dimension in the protruding direction larger than the dimension of the external terminals 1P, 1N of the secondary cells 1 in the protruding direction, and so defines a space S between the external terminals 1P, 1N and the reinforcing part 30. The protrusion 25a has a screw hole 25b on the surface facing the reinforcing part 30.

In one example, the end fixed parts 31 of the reinforcing part 30 are each fixed to the corresponding side block 24 by inserting a bolt 32b into the through hole 31a and screwing the bolt 32b into the screw hole 24b of the side block 24 of the battery module 20 for fastening. In one example, the intermediate fixed part 32 of the reinforcing part 30 is fixed to the center block 25 by inserting a bolt 32b into the through hole 32a and screwing the bolt 32b into the screw hole 25b of the center block 25 for fastening. In one example, the intermediate fixed part 32 of the reinforcing part 30 is fixed to the bottom wall 10e of the case 10 by inserting a bolt 32b into a through hole of the bottom wall 10e of the case 10 and a through hole 32d of the fixed protrusion 32c and fastening a nut 32e at the distal end of the bolt 32b.

In one example, the reinforcing part 30 is disposed in the auxiliary storage space S2 of the case 10. The reinforcing part 30 extends in the longitudinal direction of the case 10 from one end to the other end of the battery storage space S1, and is displaced from the center of the case 10 in the transverse direction. More specifically, the battery storage space S1 is placed on the rear in the depth direction of the case 10, and the reinforcing part 30 is placed in front of the center of the case 10 in the depth direction. In the battery pack 100 of the present embodiment, the reinforcing part 30 is placed between the control unit 28 and the battery module 20.

The battery storage space S1 in a broad sense is an area in which the battery module 20 is placed. As described above, this space is defined by the three side walls 10a, 10c, 10d on one side in the transverse direction and on both sides in the longitudinal direction of the case 10, the bottom wall 10e and the cover 12, and the resin bus bar case 26 facing the terminal surfaces 1a of the secondary cells 1. In this sense, the end fixed parts at both ends of the reinforcing part 30 are fixed to the pair of side blocks 24 of the battery module 20 in the longitudinal direction of the case 10. This means that the reinforcing part 30 extends from one end to the other end of the battery storage space S1 in the longitudinal direction of the case 10.

The battery storage space S1 in a narrow sense is a space that stores the secondary cells 1. That is, the battery storage space S1 is an area in which two or more battery rows L1 of the battery module 20 are placed, for example. More specifically, the battery storage space S1 is defined by the rear side wall 10a in the depth direction of the case 10, the end plates 23, the side blocks 24, the center block 25, and the bus bar case 26 of the battery module 20, for example. In this sense, both ends of the reinforcing part 30 in the longitudinal direction of the case 10 extend outward beyond both ends of the plurality of battery storage spaces S1 aligned in the longitudinal direction of the case 10.

Both ends of the reinforcing part 30 in the one direction D1 as the extending direction of the reinforcing part 30 may extend outward beyond both ends of the battery module 20 in the one direction D1, that is, beyond the end faces of the side blocks 24. Both ends of the reinforcing part 30 in the one direction D1 may be located at both ends of the battery module 20 in the one direction D1 or inside the both ends.

In the example of FIG. 4, the reinforcing part 30 is opposed to the terminal surfaces 1a of the secondary cells 1 with the components of the battery module 20, such as the busbar case 26 and the bus bars 21, sandwiched therebetween. The reinforcing part 30 is directly placed on the upper surface of the bottom wall 10e of the case 10 and so is in contact with the bottom wall 10e. In one example, the reinforcing part 30 is disposed in the auxiliary storage space S2 at a position that is displaced closest to the battery storage space S1, so as to place auxiliaries 27, such as a junction box making up the control unit 28, between the front side wall 10b in the depth direction of the case 10 and the reinforcing part 30.

The following describes advantageous effects of the battery pack 100 according to the present embodiment.

The battery pack 100 of the present embodiment is mounted in a vehicle, such as an electric vehicle or a hybrid vehicle. The signal connector 102 is connected to the controller in the vehicle to exchange information and receive power via the signal connector 102. The battery pack 100 stores the electric power supplied to the high-voltage terminals 101, 101 in the secondary cells 1, and supplies the electric power stored in the secondary cells 1 to the outside via the high-voltage terminals 101, 101. When an accident happens, such as a vehicular crash, for example, an external force exceeding the crush resistance of the case 10 may act on the case 10 of the battery pack 100.

As described above, the battery pack 100 of the present embodiment includes the battery module 20 made up of the plurality of secondary cells 1, and the case 10 that stores the battery module 20. The battery pack 100 has the reinforcing part 30 that is in contact with the bottom wall 10e of the case 10. The reinforcing part 30 extends in one direction D1 along the bottom wall 10e, and has a dimension in a direction orthogonal to the one direction D1 that is larger than thickness t of the side walls 10a, 10b, 10c, 10d of the case 10 and of the bottom wall 10e. The reinforcing part 30 has the pair of end fixed parts 31 that are fixed to both ends of the battery module 20 in the one direction D1, and the intermediate fixed part 32 located between the pair of end fixed parts 31 and fixed to the battery module 20 or the case 10.

With this configuration, the case 10 and the battery module 20 are reinforced by the reinforcing part 30 extending from one end to the other end of the battery module 20 including the plurality of secondary cells 1. The reinforcing part 30 is in contact with the bottom wall 10e of the case 10 and extends in one direction along the bottom wall 10e, so that the reinforcing part 30 can be supported by the bottom wall 10e of the case 10. When an external force acts on the case 10, for example, this configuration suppresses bending in the directions intersecting the one direction D1 as the extending direction of the reinforcing part 30, including the direction in which the reinforcing part 30 and the battery module 20 face each other (X-axis direction) and the direction perpendicular to the bottom wall 10e of the case 10 (Z-axis direction).

The reinforcing part 30 is fixed at two points to both ends of the battery module 20 via the pair of end fixed parts 31 in the one direction D1 as the extending direction. The reinforcing part 30 is configured so that the intermediate fixed part 32 between the pair of end fixed parts 31 is fixed to at least one of the battery module 20 and the case 10, and so three or more points of the reinforcing part 30 are fixed.

In this way, the reinforcing part 30 is fixed at three or more points of the both ends and the intermediate portion in the one direction D1, so that when an external force acts on the case 10, bending of the reinforcing part 30 can be prevented in the directions intersecting the one direction D1. When the pair of end fixed parts 31 of the reinforcing part 30 are fixed to the battery module 20 and the intermediate fixed part 32 of the reinforcing part 30 is fixed to the case 10, the battery module 20 is fixed to the case 10 via the reinforcing part 30. This improves vibration resistance of the battery module 20.

The battery module 20 is fixed to the case 10 via the reinforcing part 30 in this way, and so the battery module 20 does not have to have a tab-shaped fixing part for fixing the battery module 20 to the case 10. This avoids interference between such a tab-shaped fixing part of the battery module 20 and the reinforcing part 30, keeps an enough cross-sectional area of the reinforcing part 30, and so improves the rigidity and load resistance of the reinforcing part 30.

When the intermediate fixed part 32 of the reinforcing part 30 is fixed to the case 10, an external force acting from the front to the rear of the case 10 in the transverse direction (X-axis negative direction) may deform the auxiliary storage space S2 of the case 10. Even in such a case, the reinforcing part 30 fixed to the case 10 can receive such an external force. This prevents the deformation from extending to the battery storage space S1 of the case 10 and so protects the secondary cells 1.

When the intermediate fixed part 32 of the reinforcing part 30 is fixed to both the case 10 and the battery module 20, the reinforcing part 30 withstands a larger external force acting on the case 10. In this way, the case 10 and the battery module 20 are reinforced more effectively. According to the battery pack 100 of the present embodiment, if an external force acts which generates a load exceeding the crush resistance of the case 10, the rigidity of the reinforcing part 30 suppresses the collapse of the case 10.

In the battery pack 100 of the present embodiment, the battery module 20 has the pair of side blocks 24 at both ends in the one direction D1, and the center block 25 between the pair of side blocks 24, and includes the plurality of secondary cells 1 between the center block 25 and each of the side blocks 24. The end fixed parts 31 of the reinforcing part 30 are fixed to the side blocks 24, and the intermediate fixed part 32 of the reinforcing part 30 is fixed to at least one of the center block 25 and the case 10.

With this configuration, the reinforcing part 30 extends from one end to the other end of the battery module 20, and reinforces the case 10 and the battery module 20 effectively. The reinforcing part 30 is fixed to the side blocks 24 and the center block 25, which have higher rigidity than the end plates 23, and so the rigidity of the case 10 and the battery module 20 improves.

Each of the secondary cells 1 in the battery pack 100 of the present embodiment has a flattened rectangular shape and has wide side surfaces 1w facing the thickness direction of the secondary cells 1 and narrow side surfaces 1n along the thickness direction. These secondary cells 1 are stacked in the thickness direction so that the wide side surfaces 1w face the bottom wall 10e of the case 10, and the narrow side surfaces 1n face the reinforcing part 30.

This configuration allows to place a lot of secondary cells 1 in the battery storage space S1 while suppressing an increase in dimension of the battery module 20 in the height direction (Z-axis direction) of the case 10. When the narrow side surface 1n of each secondary cell 1 facing the reinforcing part 30 is the terminal surface 1a, the reinforcing part 30 protects the terminal surface 1a and the external terminals 1P and 1N of the secondary battery 1, the bus bars 21, the bus bar case 26 and the electronic circuit board on the bus bar case 26.

In the battery pack 100 of the present embodiment, each secondary cell 1 has external terminals 1P and 1N protruding toward the reinforcing part 30 on the terminal surface 1a which is the narrow side surface 1n facing the reinforcing part 30. Each of the side blocks 24 of the battery module 20 has the protrusion 24a protruding in the protruding direction of the external terminals 1P and 1N of the secondary cell 1. This protrusion 24a has a dimension in the protruding direction larger than the dimension of the external terminals 1P, 1N in the protruding direction, and so defines a space S between the external terminals 1P, 1N and the reinforcing part 30.

This configuration avoids the interference between the external terminals 1P and 1N of the secondary cells 1 and the reinforcing part 30. The bus bars 21, the bus bar case 26 and the electronic circuit board on the bus bar case 26 can be placed in the space S between the battery module 20 and the reinforcing part 30. When the side blocks 24 of the battery module 20 do not have the protrusions 24a, the reinforcing part 30 may have a protrusion that protrudes in the protruding direction of the external terminals 1P and 1N of the secondary cells 1. Such a protrusion also has the same advantageous effect from the protrusions 24a of the side blocks 24 in the battery module 20.

The battery pack 100 of the present embodiment includes the control unit 28 that controls charging and discharging of the secondary cells 1. The reinforcing part 30 is placed between the control unit 28 and the battery module 20. With this configuration, the reinforcing part 30 is placed at a center part of the case 10, and so reinforces the case 10 and the battery module 20 effectively. The reinforcing part 30 is placed between the battery storage space S1 and the auxiliary storage space S2 to effectively utilize the space inside the case 10.

The battery pack 100 of the present embodiment includes the battery module 20 made up of the plurality of secondary cells 1 stacked in the battery storage space S1. With this configuration, the reinforcing part 30 reinforces the case 10, and so protects the battery module 20 disposed in the battery storage space S1 inside the case 10. This improves the reliability and safety of the battery pack 100 including a plurality of secondary cells 1 for in-vehicle use, for example.

In the battery pack 100 of the present embodiment, the case 10 has a rectangular box shape having the bottom wall 10e, and has the height direction perpendicular to the bottom wall 10e, the longitudinal direction perpendicular to the height direction, and the transverse direction perpendicular to these longitudinal direction and height direction. The battery pack 100 has the auxiliary storage space S2 adjacent to the battery storage space S1 in the transverse direction. The reinforcing part 30 is placed in the auxiliary storage space S2, extends in the longitudinal direction of the case 10, and is displaced from the center of the case 10 in the transverse direction.

With this configuration, when an external force exceeding the crush resistance of the case 10 acts in the transverse direction of the case 10 in the battery pack 100 of the present embodiment, the auxiliary storage space S2 acts as a buffer, and so suppresses the collapse of the battery storage space S1 and protects the secondary cells 1.

In the battery pack 100 of the present embodiment, both ends of the reinforcing part 30 may be in contact with both side walls of the case 10 in the longitudinal direction of the case 10. With this configuration, the reinforcing part 30 reinforces the side walls at both ends of the case 10 in the longitudinal direction. This configuration improves the crush resistance of the case 10, and the case 10 protects the secondary cells 1, so that the reliability of the battery pack 100 improves. The side walls at both ends of the case 10 in the longitudinal direction support the reinforcing part 30, and the reinforcing part 30 can be easily fixed to the case 10.

The battery pack 100 of the present embodiment is configured so that the reinforcing part 30 has a length in the one direction D1 that is larger than the length of the secondary cells 1 in the one direction D1. With this configuration, when an external force acts in the longitudinal direction of the case 10, the both ends of the reinforcing part 30 receive the external force outside the both ends of the secondary cells 1 in the one direction D1. This prevents the external force from acting on the secondary cells 1. The reinforcing part 30 therefore can effectively protect the secondary cells 1 from an external force acting on the case 10.

As described above, the present embodiment provides the battery pack 100 capable of improving load resistance of the reinforcing part 30 and protecting the secondary cells 1 inside the case 10. The battery pack of the present invention is not limited to the configuration of the battery pack 100 according to the above-described embodiment. The following describes modified examples of the battery pack 100 of the present embodiment.

Figure 6:
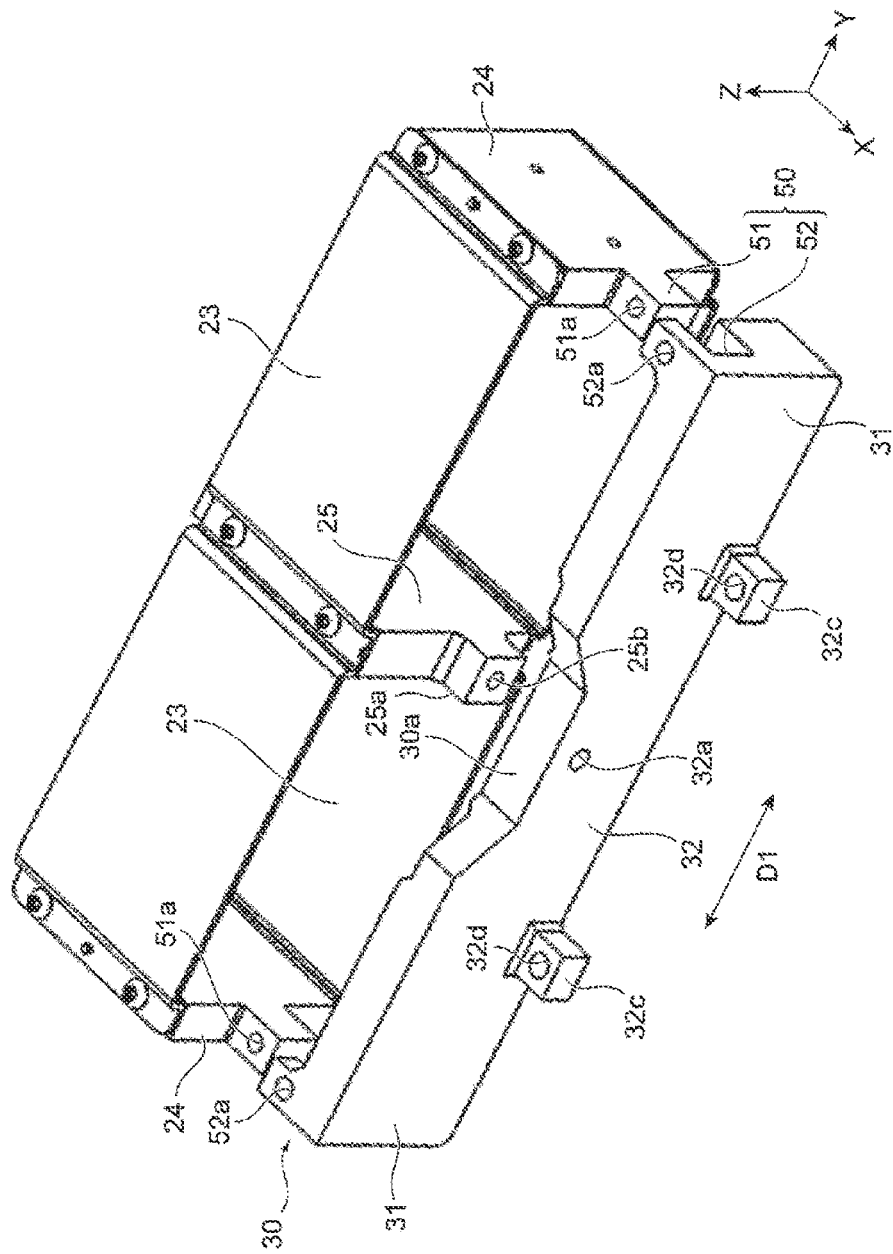
FIG. 6 is an exploded perspective view of a modified example of the reinforcing part and the battery module in FIG. 5.

FIG. 6 is an exploded perspective view of a modified example of the reinforcing part 30 and the battery module 20 in FIG. 5. In this modified example, the battery pack 100 has fitting parts 50 for fitting of the side blocks 24 of the battery module 20 and the end fixed parts 31 of the reinforcing part 30. Each fitting part 50 has a protrusion 51 and a recess 52 that fit with each other, and a fastener that fastens these protrusion 51 and recess 52. Examples of the fastener include a bolt 31b.

More specifically, in one example, each side block 24 of the battery module 20 has the protrusion 51 of the fitting part 50, and each end fixed part 31 of the reinforcing part 30 has the recess 52 of the fitting part 50. In one example, the recess 52 has a through hole 52a for insertion of the bolt 31b from the surface of the reinforcing part 30 on the opposite side to the bottom wall 10e of the case 10 in the height direction (Z-axis direction) of the case 10 to the recess 52. The protrusion 51 has a screw hole 51a for screwing a bolt 31b inserted into the through hole 52a of the recess 52 for fastening. The screw hole 51a extends in the height direction of the case 10.

With this configuration, the protrusion 51 of the fitting part 50 fitting with the recess 52 firmly fixes the reinforcing part 30 to each side block 24, and so the rigidity and load resistance of the battery module 20 and the reinforcing part 30 improve. The reinforcing part 30 is fixed to each side block 24 by screwing the bolt 31b in the height direction of the case 10. The auxiliaries 27 therefore do not interfere with this work, and so the battery pack 100 can be assembled efficiently. Each side block 24 of the battery module 20 may have the recess 52 of the fitting part 50 and each end fixed part 31 of the reinforcing part 30 may have the protrusion 51 of the fitting part 50, from which similar advantageous effects will be obtained.

Figure 7:
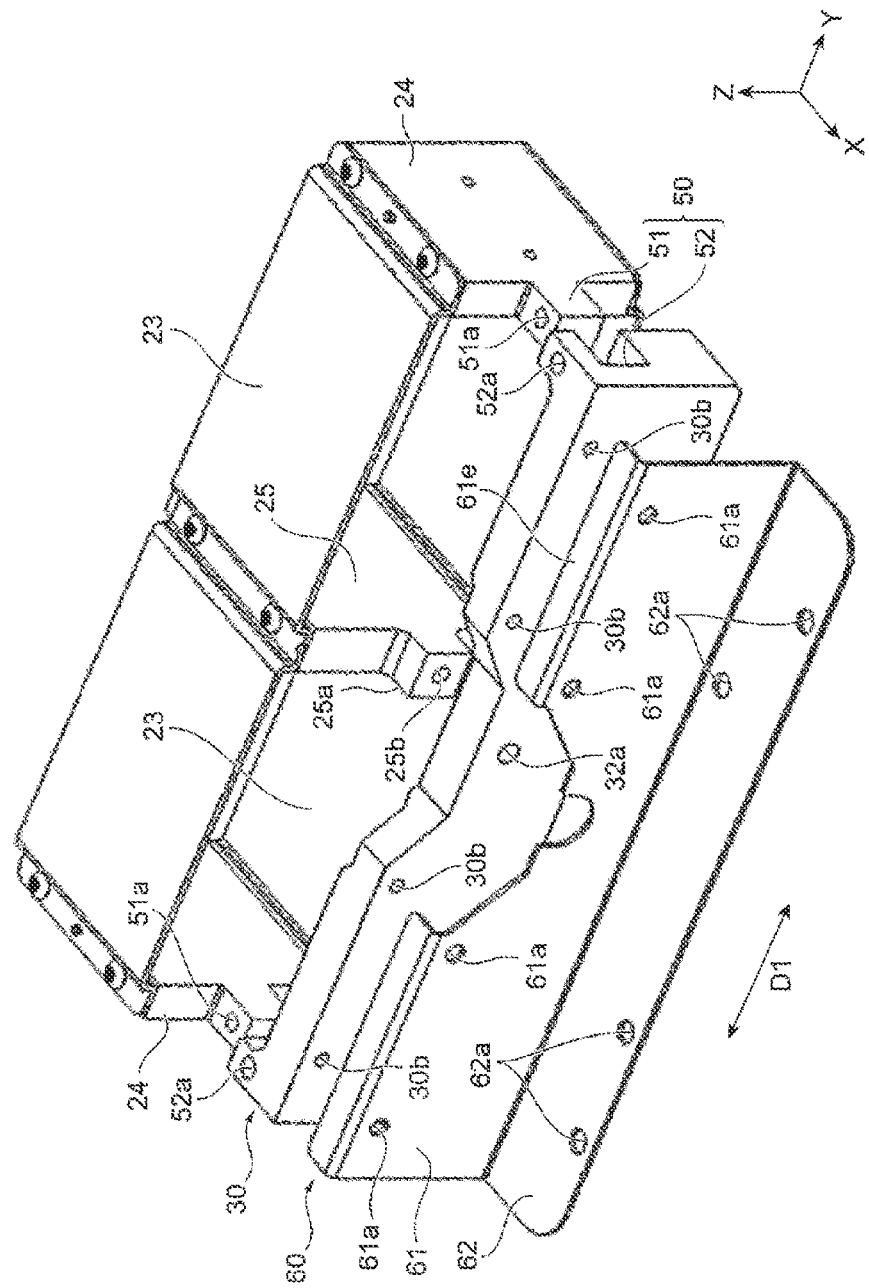
FIG. 7 is an exploded perspective view of a modified example of the reinforcing part and the battery module in FIG. 5.

FIG. 7 is an exploded perspective view of a modified example of the reinforcing part 30 and the battery module 20 in FIG. 5. In this modified example, the battery pack 100 has a plate member 60 to fix the intermediate fixed part 32 of the reinforcing part 30 to the case 10. In one example, the plate member 60 includes a first portion 61 to be fixed to the reinforcing part 30, and a second portion 62 to be fixed to the bottom wall 10e of the case 10 and disposed between the bottom wall 10e and the control unit 28. In one example, the reinforcing part 30 is made of metal or resin, and the plate member 60 is made of metal.

Examples of the resin material of the reinforcing part 30 include a fiber reinforced plastic or a resin material having a Young's modulus of 10 [GPa] or more. Similarly to the metal material of the reinforcing part 30 as described above, examples of the material of the plate member 60 include stainless steel and aluminum alloys.

In one example, the first portion 61 of the plate member 60 has a plurality of through holes 61a. The first portion 61 has an end 61e on the opposite side of the second portion 62, and this end 61e is bent substantially perpendicular to the first portion 61 in a direction opposite to the second portion 62, that is, toward the battery storage space S1.

The second portion 62 of the plate member 60 is bent substantially perpendicular to the first portion 61 toward the auxiliary storage space S2 of the case 10. In one example, the second portion 62 has a plurality of through holes 62a. In one example, the bottom wall 10e of the case 10 has a plurality of through holes (not illustrated) at positions corresponding to the through holes 62a. In one example, the second portion 62 is fixed to the bottom wall 10e of the case 10 by inserting a bolt 32b into a through hole of the bottom wall 10e of the case 10 and the corresponding through hole 62a and fastening a nut 32e to the bolt 32b.

The control unit 28 making up a junction box that stores an electronic circuit board 29 has through holes (not illustrated) at positions corresponding to the through holes 62a of the second portion 62. In one example, the control unit 28 is fixed on the second portion 62 of the plate member 60 by inserting a bolt 32b into a through hole of the bottom wall 10e of the case 10, the corresponding through hole 62a of the second portion 62 of the plate member 60, and the corresponding through hole of the control unit 28, and fastening a nut 32e to the bolt 32b.

The reinforcing part 30 has a plurality of screw holes 30b at positions corresponding to the through holes 61a in the surface facing the plate member 60. In one example, the first portion 61 is fixed to the reinforcing part 30 by inserting a bolt 32b into one of the plurality of through holes 61a, and screwing the bolt 32b into the corresponding screw hole 30b of the reinforcing part 30 for fastening.

With this configuration, the intermediate fixed part 32 of the reinforcing part 30 is fixed to the bottom wall 10e of the case 10 by the plate member 60. In this way the battery module 20 is fixed to the bottom wall 10e of the case 10 via the reinforcing part 30 and the plate member 60, and so the vibration resistance of the battery module 20 improves. The plate member 60 reinforces the case 10 and the reinforcing part 30, and so the rigidity and load resistance of the reinforcing part 30 improve. The case 10 and the battery module 20 therefore are reinforced more effectively.

The plate member 60 is configured so that the first portion 61 has the end that is bent substantially perpendicular to the first portion 61 and the second portion 62 is bent substantially perpendicular to the first portion 61 in the direction opposite to the end of the first portion 61. This improves the rigidity of the plate member 60, and so the rigidity and load resistance of the reinforcing part 30 improve.

Figure 8:
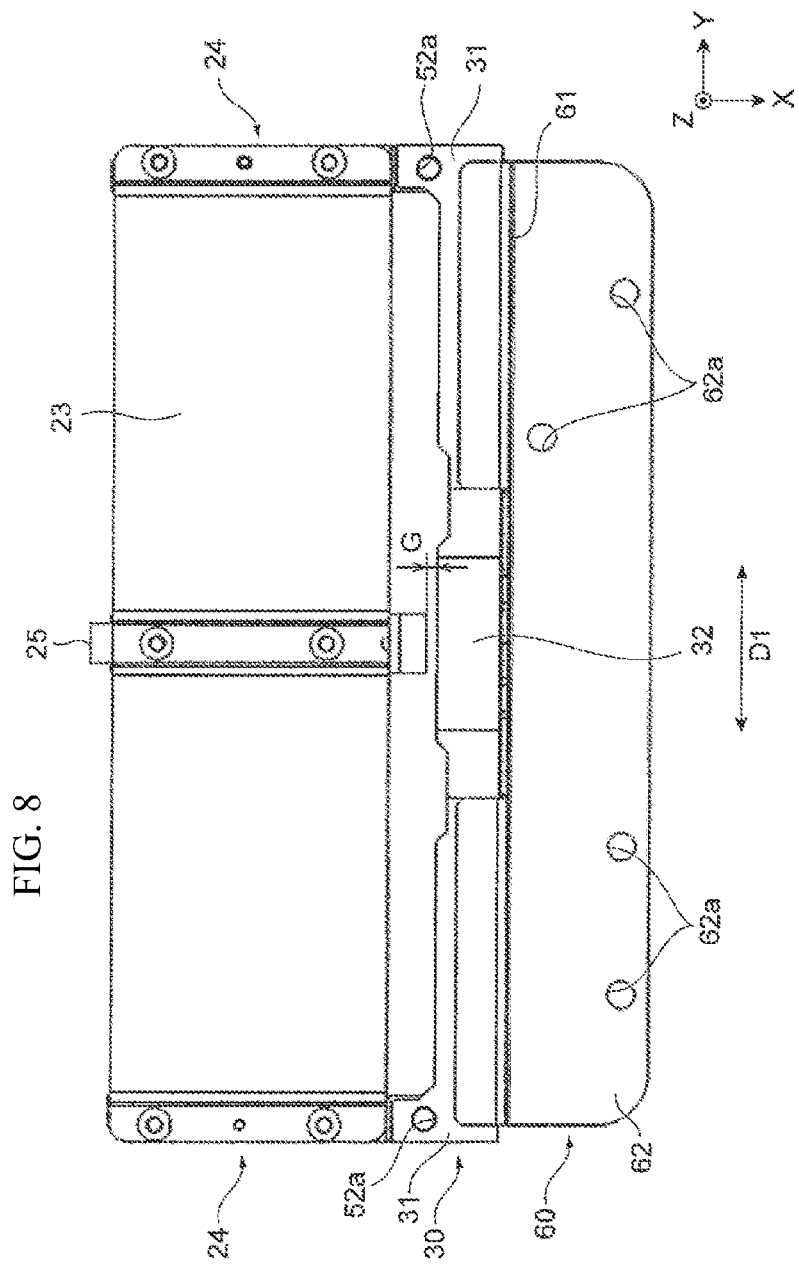
FIG. 8 is a plan view of a modified example of the reinforcing part and the battery module in FIG. 5.

FIG. 8 is a plan view of a modified example of the reinforcing part 30 and the battery module 20 in FIG. 5. The battery pack 100 in this modified example is configured so that the intermediate fixed part 32 of the reinforcing part 30 is fixed to the case 10 via the plate member 60, and has a gap G about 0.5 mm to 3 mm, for example, with the center block 25.

With this configuration, when an external force acts on the reinforcing part 30 and the plate member 60 from the front to the rear in the transverse direction of the case 10 (X-axis negative direction), for example, an intermediate portion of the reinforcing part 30 and the plate member 60 in the one direction D1 as the longitudinal direction will be deformed toward the center block 25. This absorbs the energy from crash or the like, and so protects the secondary cells 1. When the reinforcing part 30 is deformed in this way, the gap G will be finally lost and the intermediate portion of the reinforcing part 30 in the one direction D1 abuts the center block 25, and this prevents further deformation of the reinforcing part 30. This improves the load resistance of the reinforcing part 30.

Figure 9:
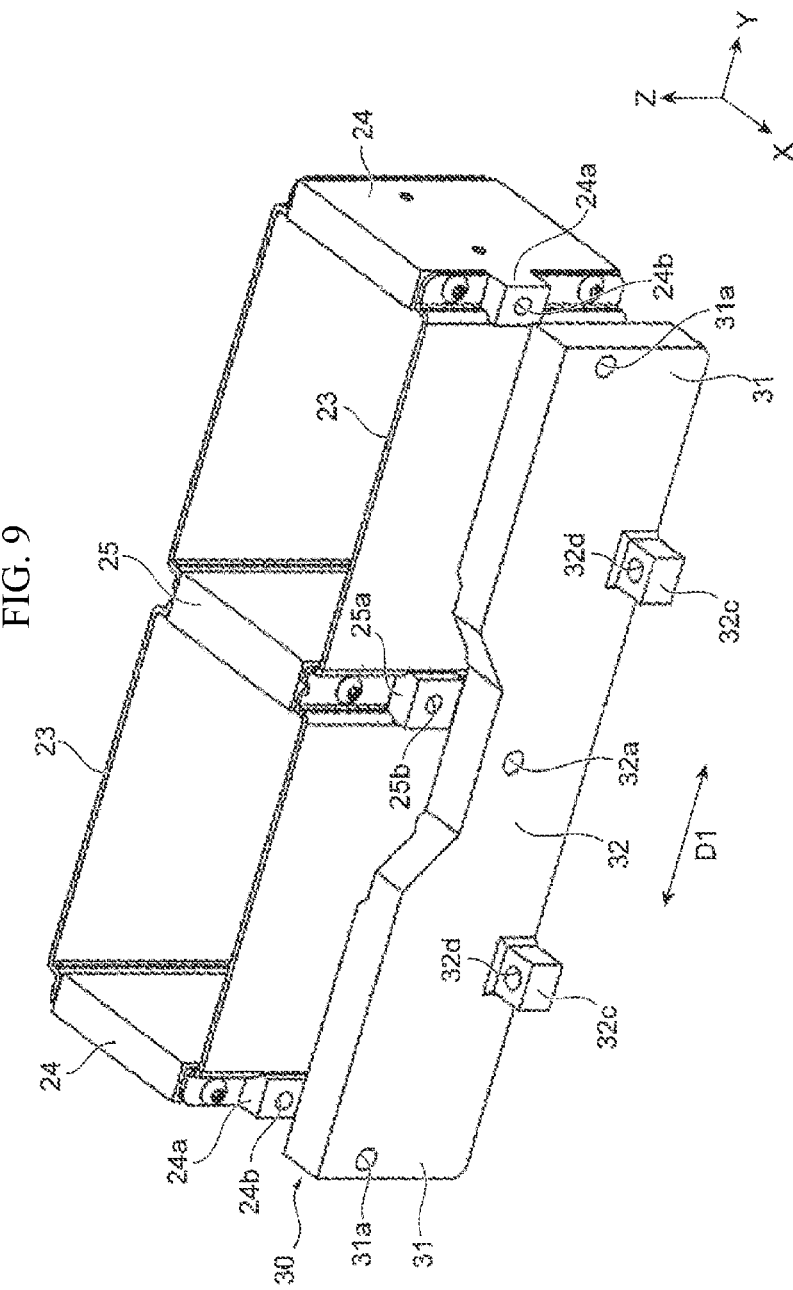
FIG. 9 is an exploded perspective view of a modified example of the reinforcing part and the battery module in FIG. 5.

FIG. 9 is an exploded perspective view of a modified example of the reinforcing part 30 and the battery module 20 in FIG. 5. In this modified example of the battery pack 100, the secondary cells 1 are placed with their terminal surfaces 1a facing in the height direction (Z-axis direction) of the case 10 opposite to the bottom wall of the case 10. The secondary cells 1 are placed with their wide side surfaces 1w facing in the transverse direction (X-axis direction) of the case 10. Such an arrangement of the secondary cells 1 also has the same advantageous effects as those of the battery pack 100 in the above-described embodiment.

That is a detailed description of the embodiment of the present invention with reference to the drawings. The specific configuration of the present invention is not limited to the above-stated embodiment, and the design may be modified variously without departing from the spirits of the present invention. The present invention also covers such modified embodiments. For example, the embodiment of the battery pack according to the present invention includes a single reinforcing part. In another embodiment, the battery pack may include a plurality of reinforcing parts, which may extend in the transverse direction as well as in the longitudinal direction of the case.

REFERENCE SIGNS LIST

1 Secondary cell
1a Terminal surface (narrow side surface)
1n Narrow side surface
1N External terminal
1P External terminal
1w Wide side surface
10 Case
10a Side wall
10b Side wall
10c Side wall 10d Side wall
10e Bottom wall
20 Battery module
24 Side block
24a Protrusion
25 Center block
28 Control unit
30 Reinforcing part
31 End fixed part
32 Intermediate fixed part
32b Bolt (fastener)
50 Fitting part
51 Protrusion
52 Recess
60 Plate member
61 First portion
62 Second portion
100 Battery pack
D1 One direction
G Gap
S Space
t Thickness

The invention claimed is:

1. A battery pack comprising:
a battery module including a plurality of secondary cells;
a case that stores the battery module, the case having a bottom wall and side walls; and
a reinforcing part that is in contact with the bottom wall of the case, the reinforcing part extending in one direction along the bottom wall, and having a dimension in a direction orthogonal to the one direction that is larger than a thickness of the side walls and of the bottom wall of the case,
wherein the reinforcing part includes:
a pair of end fixed parts that are fixed to both ends of the battery module in the one direction,
an intermediate fixed part located between the pair of end fixed parts and fixed to the battery module or the case, and
a cutout formed in the intermediate fixed part on a first surface of the reinforcing part that is opposite a second surface of the reinforcing part that is in contact with the bottom wall, wherein the cutout accommodates a terminal portion of the battery module.

2. The battery pack according to claim 1, wherein the battery module has a pair of side blocks at both ends in the one direction, and a center block between the pair of side blocks, and includes the plurality of secondary cells between the center block and each of the side blocks,
each of the end fixed parts is fixed to the corresponding side block, and
the intermediate fixed part is fixed to the center block or the case.

3. The battery pack according to claim 2, further comprising fitting parts that are each configured to fit one of the side blocks to the corresponding end fixed part, wherein
each fitting part has a protrusion and a recess that fit with each other, and a fastener that fastens the protrusion and the recess.

4. The battery pack according to claim 2, wherein the intermediate fixed part is fixed to the case, and has a gap with the center block.

5. The battery pack according to claim 2,
wherein each of the plurality of secondary cells has a flattened rectangular shape having a thickness and has wide side surfaces facing in a direction of the thickness of the secondary cells and narrow side surfaces along a thickness direction, the secondary cells are stacked in the thickness direction so that the wide side surfaces face the bottom wall, and the narrow side surfaces face the reinforcing part.

6. The battery pack according to claim 5, wherein each of the secondary cells has external terminals on one of the narrow side surfaces that is opposed to the reinforcing part, the external terminals protruding toward the reinforcing part,
the reinforcing part or each of the side blocks has a protrusion protruding in a protruding direction of the external terminals, and
the protrusion has a dimension in the protruding direction larger than a dimension of the external terminals in the protruding direction, and defines a space between the external terminals and the reinforcing part.

7. The battery pack according to claim 1, further comprising a control unit configured to control charging and discharging of the secondary cells, wherein
the reinforcing part is disposed between the control unit and the battery module.

8. The battery pack according to claim 7, further comprising a plate member configured to fix the intermediate fixed part to the case.

9. The battery pack according to claim 8, wherein the plate member has a first portion fixed to the reinforcing part and a second portion fixed to the bottom wall and disposed between the bottom wall and the control unit.

10. The battery pack according to claim 8, wherein the reinforcing part comprises metal or resin, and the plate member comprises metal.

11. The battery pack according to claim 1, wherein the reinforcing part has a length in the one direction that is longer than a length of each of the secondary cells in the one direction.

12. A battery pack comprising:
a plurality of secondary cells, where each of the plurality of secondary cells has a flattened rectangular shape having a thickness and has wide side surfaces facing in a direction of the thickness of the secondary cells and narrow side surfaces along a thickness direction
a battery module including the plurality of secondary cells, wherein the battery module has a pair of side blocks at both ends in one direction, and a center block between the pair of the side blocks, and includes the plurality of secondary cells between the center block and each of the side blocks;
a case that stores the battery module, the case having a bottom wall and side walls, wherein the secondary cells are stacked in the thickness direction so that the wide side surfaces face the bottom wall, and the narrow side surfaces face a reinforcing part; and
the reinforcing part that is in contact with the bottom wall of the case, the reinforcing part extending in one direction along the bottom wall, and having a dimension in a direction orthogonal to the one direction that is larger than a thickness of the side walls and of the bottom wall of the case,
wherein the reinforcing part includes:
a pair of end fixed parts that are fixed to both ends of the battery module in the one direction, wherein each of the pair of fixed parts is fixed to a corresponding side block, and
an intermediate fixed part located between the pair of the end fixed parts and fixed to the center block or the case.

13. The battery pack according to claim 12, further comprising fitting parts that are each configured to fit one of the side blocks to the corresponding end fixed part, wherein
    each fitting part has a protrusion and a recess that fit with each other, and a fastener that fastens the protrusion and the recess.

14. The battery pack according to claim 12, wherein the intermediate fixed part is fixed to the case, and has a gap with the center block.

15. The battery pack according to claim 12, wherein each of the secondary cells has external terminals on one of the narrow side surfaces that is opposed to the reinforcing part, the external terminals protruding toward the reinforcing part,
    the reinforcing part or each of the side blocks has a protrusion protruding in a protruding direction of the external terminals, and
    the protrusion has a dimension in the protruding direction larger than a dimension of the external terminals in the protruding direction, and defines a space between the external terminals and the reinforcing part.

16. The battery pack according to claim 12, further comprising a control unit configured to control charging and discharging of the secondary cells, wherein
    the reinforcing part is disposed between the control unit and the battery module.

17. The battery pack according to claim 16, further comprising a plate member configured to fix the intermediate fixed part to the case.

18. The battery pack according to claim 17, wherein the plate member has a first portion fixed to the reinforcing part and a second portion fixed to the bottom wall and disposed between the bottom wall and the control unit.

19. The battery pack according to claim 17, wherein the reinforcing part comprises metal or resin, and the plate member comprises metal.

20. The battery pack according to claim 12, wherein the reinforcing part has a length in the one direction that is longer than a length of each of the secondary cells in the one direction.

* * * * *